(12) United States Patent
Parfitt

(10) Patent No.: US 11,170,627 B2
(45) Date of Patent: Nov. 9, 2021

(54) PROCESS MONITORING

(71) Applicant: Eaton Intelligent Power Limited, Dublin (IE)

(72) Inventor: Stewart John Parfitt, Whempstead (GB)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/825,825

(22) Filed: Mar. 20, 2020

(65) Prior Publication Data
US 2020/0302770 A1 Sep. 24, 2020

(51) Int. Cl.
*G08B 21/18* (2006.01)

(52) U.S. Cl.
CPC .................... *G08B 21/18* (2013.01)

(58) Field of Classification Search
None
See application file for complete search history.

(56) References Cited

U.S. PATENT DOCUMENTS

| | | | |
|---|---|---|---|
| 8,890,773 B1* | 11/2014 | Pederson | H04B 10/116 345/8 |
| 2002/0130846 A1 | 9/2002 | Nixon et al. | |
| 2012/0044047 A1* | 2/2012 | Morgan | G07C 9/10 340/5.2 |
| 2016/0132046 A1 | 5/2016 | Beoughter et al. | |
| 2016/0285959 A1* | 9/2016 | Vasko | G05B 19/4185 |
| 2017/0046891 A1* | 2/2017 | Trivelpiece | G07C 9/00174 |
| 2018/0091176 A1 | 3/2018 | Chin | |
| 2019/0014220 A1* | 1/2019 | Fogelson | H04M 3/42357 |

* cited by examiner

*Primary Examiner* — Thomas S McCormack
(74) *Attorney, Agent, or Firm* — Stinson LLP

(57) ABSTRACT

The present invention provides for a mobile process-interaction device for interacting with a process at a processing location, and a related method of interaction, the device having an input module for accepting data produced by the process, an output module for providing user-information, and wherein the process-interaction device comprises a mobile wearable electronic interaction device arranged for communication by way of a human machine interface at the processing location.

27 Claims, 2 Drawing Sheets

PROCESS MONITORING

CROSS-REFERENCE TO RELATED APPLICATION

Figure 1:
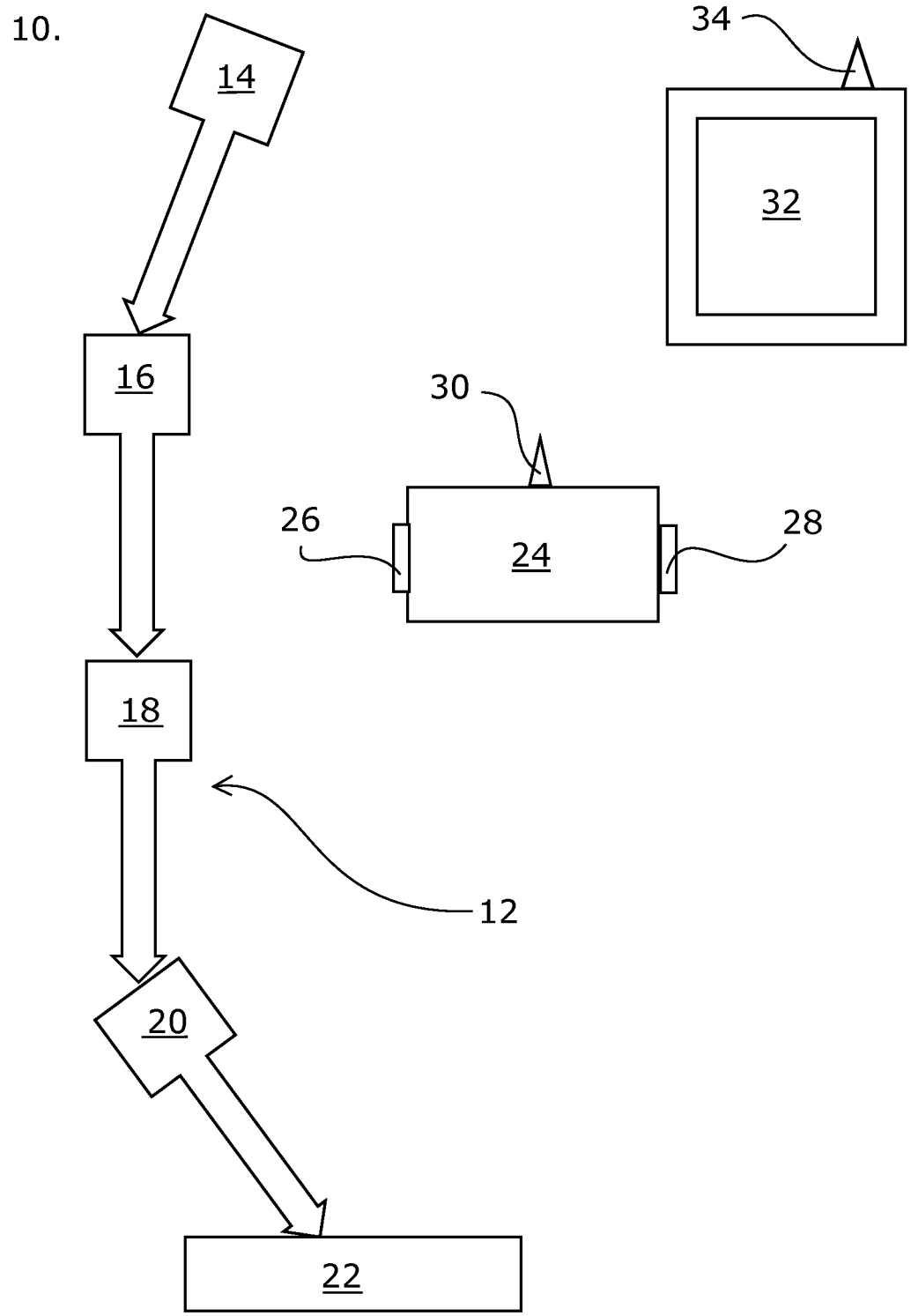

This application claims priority to United Kingdom Patent Application No. GB1904001.3, filed Mar. 22, 2019, hereby incorporated by reference in its entirety.

BACKGROUND

The present invention relates to processing environments and the interaction of operatives located in the environment with a process, in particular for the purposes of monitoring and/or control.

Within a processing environment, it is commonly required that an operative interacts with the process for the purposes of monitoring and/or control, and such interaction is most commonly achieved by way of a Human Machine Interface (HMI) terminals.

In order to allow for complete monitoring/control of the whole process, a plurality of HMI terminals are commonly provided within a processing environment, and each of which allows for the required interaction at various locations/times within the process of interest.

However, the current provision of a plurality of HMI terminals within a processing environment/facility can prove limiting and disadvantageous insofar as, in order to conduct each relevant monitoring/control interaction, the operative requires access, generally through a logon procedure, separately to each of the HMI terminals. Each HMI terminal is generally tethered to its own respective position relating to a stage of the process.

This disadvantageously limits the flexibility and efficiency with which an operative can engage with a process, and also increases the likelihood of a failure at one of the HMI terminals affecting the whole monitoring/control operation. Interaction by way of a plurality of HMI terminals can also prove a disadvantageously time-consuming, and unnecessary complex, procedure.

DETAILED DESCRIPTION

The present invention seeks to provide for apparatus and methods for process interaction in a manner having advantages over known such apparatus and methods.

According to one aspect of the present invention, there is provided a mobile process-interaction device for interacting with a process at a processing location, the device having an input module for accepting data produced by the process, an output module for providing user-information, wherein the mobile process-interaction device comprises a user-wearable electronic interaction device arranged for communication by way of a human machine interface at the processing location.

The invention can prove advantageous insofar as the wearable device enhances the flexibility with which an operative can engage with a process, both with regard to the actual points of engagement within the process, and the ease with which the operative can interact with the process at each point of engagement.

The connectivity offered by the present invention within the processing environment can therefore advantageously only require a single HMI terminal, while the mobility of the wearable device allows the user to communicate with that single terminal from any location within the processing environment, and from any point of interaction with the process.

Advantageously, the wearable device allows for interaction with the process for purposes of control and/or data entry or retrieval.

As further advantages, the said input module can be arranged for accepting data from the process in any appropriate format whether passively, actively and through wireless connectivity and/or inspection.

According to one particular feature device can be arranged for visual inspection for the purposes of monitoring and/or controlling stages of the process.

Advantageously, the said input module can include image-capture functionality.

The output module can be advantageously arranged to provide information output to the wearer and/or to a remote location for storage and/or further analysis as required.

As a further advantage, the use of the wearable device linked to the said HMI terminal allows an operative to move around the processing location while remaining virtually connected to the process by way of the said HMI terminal.

The wearable device can be arranged for said communication at the processing location to the HMI terminal within the location, or by way of HMI functionality to a location remote from the processing location.

The device can therefore prove advantageous in allowing for the direct supply of information to the wearer as part of their interaction with process and/or for the supply of process-related information to the said remote location for further analysis in a manner isolated from the process itself.

Advantageously, the device is arranged with access-control functionality to allow for selective control of the wearer to different parts of the process under investigation as required.

Preferably, the device is arranged for the delivery of information to the wearer in any one or more of a visual, audible, tactile and/or haptic format as required.

Advantageously, the wearable device allows for selection of the information format. In particular, the wearable device can be arranged such that the said selection of the information format is responsive to at least a characteristic of the process under investigation.

Advantageously, the wearable device can be arranged such that the presence of the said at least one characteristic is determined through processing information retrieved from the process. In particular, retrieval of information relating to the said at least one characteristic can be by way of image-recognition means.

Yet further, the wearable device can also be arranged for the detection of characteristics associated with potentially problematic and/or dangerous processing parameters. In this manner, the wearable device can advantageously be arranged for the identification of unexpected processing parameters as part of process of monitoring functionality.

The wearable device can be arranged to present information output by way of the said output module to the wearer and/or to transmit such information for remote processing.

The input module can advantageously be arranged to identify safe working conditions and/or hazardous conditions.

Advantageously, the wearable device can include sensor functionality for determining a change in environmental conditions to the sensing of any one or more of temperature, gas, noise and/or motion.

The invention finds particular use within hazardous environments and also, or addition, in cleanroom environments.

As a particular advantage, the wearable device comprises an intrinsically safe wearable device.

It should therefore be appreciated that the present invention also allows for greater flexibility during the initial design phase for a processing facility since a predetermined location for the HMI terminals is not required.

In known systems, the HMI terminals, and their locations, have to be pre-determined and are generally fixed. If it becomes necessary to change the configuration of the processing facility/environment this can prove particularly expensive and disruptive and time-consuming. In addition, if an operative wishes to move within the processing facility, there is a danger that they might lose HMI visibility at least until their movement brings them into potential connectivity with another HMI terminal.

With a wearable device such as that embodying the present invention, there is no need for an operative to maintain physical connection at any one HMI terminal. Only one HMI terminal need be provided and the operative can retain connectivity there with from any location within the processing facility and thus from any process location.

However, in one embodiment the wearable device can itself include HMI terminal functionality.

A variety of user input/output devices, the other virtual or otherwise, can be provided on the wearable device, which can lead to further processing facility's implication and cost reduction, with associated advantages relating to ongoing maintenance.

According to another aspect of the present invention there is provided a process-interaction system including a wearable electronic interface device as defined above and an associated HMI terminal.

If appropriate, the HMI terminal can be provided with a KVM extender.

Advantageously, the HMI terminal can be arranged for further wireless connectivity, to further enhance/expand its functionality.

Figure 2:
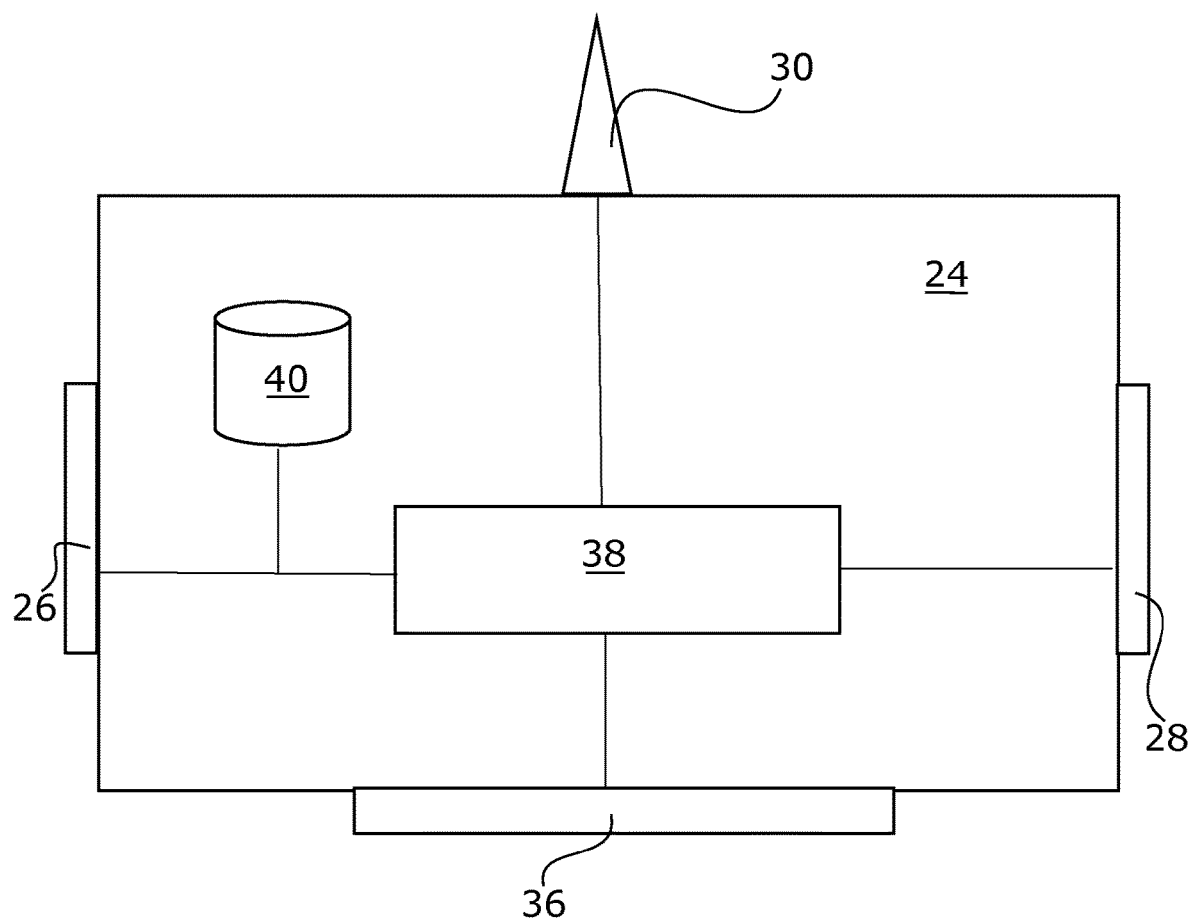

The invention is described further hereinafter, by way of example only, with reference to the accompanying drawings in which:

FIG. 1 is a schematic representation of a processing facility at which a process is running and is to be monitored by way of a wearable device, and related system, according to one embodiment of the present invention; and FIG. 2 is a schematic representation in further detail of an example of a wearable device according to an embodiment of the present invention.

Turning first to FIG. 1, there is illustrated in schematic form a processing facility 10 within which a process 12 requiring interaction through, for example, monitoring and/or control is undertaken.

One particular example of such a processing facility is a cleanroom and/or a facility comprising a hazardous environment.

The process 12 running in the facility 10 is schematically illustrated with separate stages 14, 16, 18, 20 and 22 which can comprise particular separated steps within a process, and generally occurring at different locations, and/or time-separated stages within a process and which could occur at the same or similar physical location.

The ease of reference an explanation, the embodiment illustrated in FIG. 1 will be considered in relation to a process 12 and related processing apparatus having fixed locations 14, 16, 18, 20 and 22 at which it is desired that an operative interact with the process for any required purposes such as control, monitoring, maintenance, fault detection and/or results last data gathering.

As discussed above in relation to the current art, known process interaction arrangements require that a separate Human Machine Interface terminal be provided at each location 14, 16, 18, 20 and 22 and which lead to the associated disadvantages discussed above.

According to the present invention, and the illustrated embodiment of FIG. 1, a wearable electronic interface device 24, having inherent mobility, is provided and associated with a single HMI terminal 32.

As will be apparent therefore, the present invention facilitates a reduction in the number of currently required HMI interface terminals, and leads to an increase in the flexibility and manner in which the operative (wearing the wearable 24) can interact with the process 12.

Although, in the illustrated embodiment, the single HMI terminal 32 is illustrated as a stand-alone terminal, the invention is not limited in this manner and the HMI functionality could also be provided on the wearable device.

In any case, the invention proves advantageous in so far as with the wearable device 24 linked to the HMI terminal 32, the operative is now able to move around the facility 10 as required and, by way of the process-interaction functionality of the wearable device 24, the operative can achieve virtual connection to the process at any particular stage 14, 16, 18, 20 and 22 or indeed elect to interact with process at other stages (not illustrated in FIG. 1), without requiring separate login/HMI-connectivity activities.

As described further below, the wearable device 24 includes an input module 26 by means of which data/information from the process 12 can be accepted, that is in any way received and/or retrieved as required. In addition, the wearable device 24 includes an output module for providing data/information to the wearer and in any appropriate format. For example, the data/information is provided to the wearer can be in a visual, audio, tactile and/or haptic format or indeed a combination of such formats.

The wearable device 24 can be further arranged so that the format of data/information output from the output module 28 of the wearable device 24 can be user-selected. In addition, or in the alternative, the format can be determined automatically and responsive to characteristics of the process and/or the nature of the particular interaction with the process being undertaken.

The wearable device 24 includes an appropriate form of communication functionality 30 for communicating with the HMI terminal 32 which also has its own communication functionality 34.

The communication functionality 34 of the HMI terminal 32, can further be arranged for wireless communication to a location remote from the processing facility 10 by way of a dedicated communication link, a private communications network or a public communications networks such as the Internet (not shown).

As an alternative, or additional, arrangements, the communication functionality 30 of the wearable device 24 can likewise be arranged for wireless connectivity to a location remote from the processing facility 10 by way of a dedicated communication link, a private communication network or a public communication network such as the Internet (not shown).

In one particular embodiment of the present invention, the wearable device can comprise any appropriate form of eyewear such as a pair of glasses, goggles or a visor arranged for both information/data acceptance from the relevant stage 14, 16, 18, 20, 22 of the process 12, and for the display of relevant data/information to the wearer.

In such an embodiment data acceptance, and in particular capture, by way of image recognition and the display of data/information to an operative by way of an image display can be readily provided.

If required, the wearable device 24 can include augmented reality functionality so that the data/information displayed for viewing by the operative is enhanced by the said augmentation to emphasise and/or clarify particular aspects of the data/information being provided to the operative.

With an arrangement involving image capture and the display of visual data/information to the operative, the operative is presented with means for facilitating the viewing/scanning of aspects/characteristics of the process 12. Further control functionality can be readily incorporated into the wearable device 24 so as to initiate the presentation of data/information to the user only upon a threshold, for example a pre-determined condition or risk level, being met or exceeded.

The control functionality of the wearable device 24 could likewise be employed so as to predetermine that a particular wearable device 24 is only able to access, that is interact with, a particular one or more of the stages 14, 16, 18, 20 and 22 of the process 12.

If required, the communication functionality 34 of the HMI terminal 32, can be provided with a KVM extender or software control can be provided within the HMI terminal 32 to extend the terminals capability via, for example, wi-fi.

Further, the wearable device 24 can be arranged for running an application for assisting with its communication link to the HMI terminal 32 in a manner facilitating the interaction of the wearable device 24, and thus of course the wearer, with the process 12. Such communication linking would advantageously not impact on the control software for the process 12 is arranged in relation to a remote terminal application. However, for a remote client application, compensating changes to the process could be adopted.

The adoption of wearable technology in the manner proposed by the present invention offers further advantages in allowing for multiple users to concurrently access data and, if required, input variables related to the process 12. The invention advantageously allows for an operative to move around the processing facility 10 without compromising their ability to interact with any permitted/required stage of the process 12 and the functionality offered by the HMI terminal 32.

Yet further, adoption of the invention can allow for multiple processes to run and for different users to have readily controlled access to the one or more processes. The control of user access rights as discussed above, and which can advantageously be employed so as to allow only a particular control-defined wearable device to have access restricted only to a selected part of the process can advantageously employ one or more of multiple access control functions such as, but not limited to, voice, retina, fingerprint and/or badge recognition.

In particular, the input and/or output modules can advantageously be adapted and employed as part of such access-control functionality as discussed above.

A further advantage is the ease of recording all user-actions and process interaction for subsequent detailed analysis if required.

Turning now to FIG. 2, there is provided in greater detail a schematic representation, of the embodiment 24 of a wearable interface device illustrated with reference to FIG. 1.

In addition to the input module 26, output module 28, and communications 30 functionality discussed above, the wearable device 24 likewise includes a user interface module 36 which can be arranged as a GUI and offering a virtual representation of input means. In addition, or in the alternative, the user interface module 36 can provide for anyone more of audio, tactile and/or haptic data input.

The provision of such a user interface module 36 assists with the degree and flexibility to which an operative wearing the wearable device 24 can interact with the process 12.

The wearable device 24 also includes processing functionality 38 and storage functionality 40, to assist with the acceptance and analysis/processing of information/data from the input module 26 and the appropriate data/information output at the output module 28. The memory functionality 40 further serves to assist with such processing, but can also provide storage functionality for generating a database of process-analysis which can be employed during subsequent process analysis steps, for example for verification purposes.

It should be appreciated that the invention is not restricted to the details of the foregoing illustrated embodiment. For example, any required form of wearable device, employing any required data/information input/output format can be employed for interacting with any required process or series/parallel processes.

Yet further, while the HMI terminal 32 functionality can, if required, be integrated into the wearable device 24, it will be appreciated that a system according to the present invention could then comprise a plurality of such wearable devices each with its own HMI functionality operating within a common processing facility 10. There will then be no need for a separate stand-alone HMI terminal 32 and, if required, one or more of the plurality of wearable devices could share access to respective integral HMI functions.

What is claimed is:

1. A process-interaction device for interacting with a process at a processing location, the device having an input module for accepting data produced by the process, and an output module for providing user-information, wherein the process-interaction device comprises a mobile wearable electronic interaction device in the form of eyewear arranged for communication by way of a human machine interface at the processing location, the eyewear having augmented reality functionality so that the data produced by the process which is displayed for viewing by a user is enhanced by the augmentation to emphasize and/or clarify particular aspects of the data being provided to the user.

2. A device as claimed in claim 1, wherein the mobile wearable electronic interaction device is configured for interaction with the process for purposes of control and/or data entry or retrieval.

3. A device as claimed in claim 1, wherein the mobile wearable electronic interaction device is configured for accepting data from the process in any appropriate format whether passively, actively, through wireless connectivity and/or inspection.

4. A device as claimed in claim 1, wherein the mobile wearable electronic interaction device is configured for visual inspection of the process for the purposes of monitoring and/or controlling stages of the process.

5. A device as claimed in claim 1, wherein the said input module includes image-capture functionality.

6. A device as claimed in claim 1, wherein the said output module is configured to provide information output to a wearer and/or to a remote location for storage and/or further analysis.

7. A device as claimed in claim 1, wherein the mobile wearable electronic interaction device is configured for communication at the processing location with a HMI terminal located within the said processing location.

8. A device as claimed claim 1, wherein the mobile wearable electronic interaction device has HMI functionality.

9. A device as claimed in claim 1, wherein the mobile wearable electronic interaction device is configured with access-control functionality to allow for the selectively controlled access of a wearer to different parts of the process under investigation.

10. A device as claimed in claim 9, wherein the selective control is automatically responsive to characteristics or features of the process and/or characteristics or features of the data/information accepted from the process.

11. A device as claimed in claim 1, wherein the mobile wearable electronic interaction device is configured to deliver information to a wearer in any one of a visual, audible, tactile and/or haptic format.

12. A device as claimed in claim 11, wherein the mobile wearable electronic interaction device is configured to allow for selection of the information format.

13. A device as claimed in claim 12, wherein the mobile wearable electronic interaction device is configured such that the selection of the information format is responsive to at least a characteristic of the process under investigation, and/or the data/information accepted therefrom.

14. A device as claimed in claim 13, wherein the mobile wearable electronic interaction device is configured such that the presence of the at least one characteristic is determined through processing information retrieved from the process.

15. A device as claimed in claim 13, wherein the mobile wearable electronic interaction device is configured such that the retrieval of information relating to the at least one characteristic is by way of image recognition.

16. A device as claimed in claim 1, wherein the mobile wearable electronic interaction device is configured to selectively present information output by way of the said output module to a wearer and/or to transmit such information for remote processing.

17. A device as claimed in claim 1, wherein the mobile wearable electronic interaction device has sensor functionality for determining a change in environmental conditions.

18. A device as claimed in claim 17, wherein the sensor functionality is arranged for sensing any one of temperature, gas, noise and/or motion.

19. A device as claimed in claim 1, wherein the mobile wearable electronic interaction device is configured for use in a hazardous environment and/or in a cleanroom environment.

20. A device as claimed in claim 1, wherein the mobile wearable electronic interaction device comprises an intrinsically safe wearable device.

21. A process-interaction system including a wearable electronic interface device as claimed in claim 1, and an associated HMI terminal.

22. A process-interaction method for interaction with a process at a processing location, the method including:
  accepting, at an input module of a mobile wearable electronic interaction device in the form of eyewear, data produced by the process;
  providing with an output module of the mobile wearable electronic interaction device user-information; and
  communicating, using the mobile wearable electronic interaction device, with a human machine interface at the processing location, the eyewear having augmented reality functionality so that the data produced by the process which is displayed for viewing by a user is enhanced by the augmentation to emphasise and/or clarify particular aspects of the data being provided to the user.

23. A method as claimed in claim 22, wherein the mobile electronic interaction device is configured according to claim 1.

24. A device as claimed in claim 1, wherein the eyewear comprises one of glasses, goggles or a visor.

25. A process-interaction device for interacting with a process at a processing location, the device having an input module for accepting data produced by the process, and an output module for providing user-information, wherein the process-interaction device comprises a mobile wearable electronic interaction device in the form of eyewear arranged for communication by way of a human machine interface at the processing location, wherein the mobile wearable electronic interaction device is configured with access-control functionality to allow for the selectively controlled access of a wearer to different parts of the process under investigation, and wherein the selective control is automatically responsive to characteristics or features of the process and/or characteristics or features of the data/information accepted from the process.

26. A process-interaction device for interacting with a process at a processing location, the device having an input module for accepting data produced by the process, and an output module for providing user-information, wherein the process-interaction device comprises a mobile wearable electronic interaction device in the form of eyewear arranged for communication by way of a human machine interface at the processing location, the mobile wearable electronic interaction device being configured to deliver information to a wearer in any one of a visual, audible, tactile and/or haptic format and configured to allow for selection of the information format, the selection of the information format being responsive to at least a characteristic of the process under investigation, and/or the data/information accepted therefrom, the presence of the at least one characteristic being determined through processing information retrieved from the process.

27. A process-interaction device for interacting with a process at a processing location, the device having an input module for accepting data produced by the process, and an output module for providing user-information, wherein the process-interaction device comprises a mobile wearable electronic interaction device in the form of eyewear arranged for communication by way of a human machine interface at the processing location, the mobile wearable electronic interaction device being configured to deliver information to a wearer in any one of a visual, audible, tactile and/or haptic format and configured to allow for selection of the information format, the selection of the information format being responsive to at least a characteristic of the process under investigation, and/or the data/information accepted therefrom, the retrieval of information relating to the at least one characteristic being by way of image recognition.

* * * * *